US010958667B1

(12) United States Patent
Maida et al.

(10) Patent No.: US 10,958,667 B1
(45) Date of Patent: Mar. 23, 2021

(54) DETERMINING COMPUTING SYSTEM INCIDENTS USING NODE GRAPHS

(71) Applicant: McAfee, LLC., Santa Clara, CA (US)

(72) Inventors: Elisabeth Maida, New York, NY (US); Roselle Safran, Washington, DC (US)

(73) Assignee: McAfee LLC, San Jose, CA (US)

( * ) Notice: Subject to any disclaimer, the term of this patent is extended or adjusted under 35 U.S.C. 154(b) by 167 days.

(21) Appl. No.: 15/612,373

(22) Filed: Jun. 2, 2017

Related U.S. Application Data (60) Provisional application No. 62/345,468, filed on Jun. 3, 2016.

(51) Int. Cl.
*H04L 29/06* (2006.01)

(52) U.S. Cl.
CPC ........ *H04L 63/1416* (2013.01); *H04L 63/145* (2013.01); *H04L 63/1441* (2013.01); *H04L 63/1483* (2013.01)

(58) Field of Classification Search
None
See application file for complete search history.

(56) References Cited

U.S. PATENT DOCUMENTS

| | | | | |
|---|---|---|---|---|
| 9,148,441 | B1 * | 9/2015 | Tamersoy | H04L 63/1416 |
| 9,166,997 | B1 * | 10/2015 | Guo | H04L 63/1433 |
| 9,183,387 | B1 * | 11/2015 | Altman | G06F 21/554 |
| 9,256,739 | B1 * | 2/2016 | Roundy | G06F 21/554 |
| 9,292,695 | B1 * | 3/2016 | Bassett | G06F 21/577 |
| 9,846,780 | B2 * | 12/2017 | Tonn | G06F 21/577 |
| 2015/0074806 | A1 * | 3/2015 | Roundy | G06F 21/55 726/23 |
| 2016/0205122 | A1 * | 7/2016 | Bassett | G06F 21/577 726/23 |
| 2017/0063910 | A1 * | 3/2017 | Muddu | H04L 43/00 |
| 2017/0300690 | A1 * | 10/2017 | Ladnai | G06F 21/554 |
| 2017/0302685 | A1 * | 10/2017 | Ladnai | H04L 63/1416 |
| 2017/0346839 | A1 * | 11/2017 | Peppe | G06F 21/577 |
| 2018/0063177 | A1 * | 3/2018 | Yamada | H04L 63/1416 |
| 2018/0069885 | A1 * | 3/2018 | Patterson | H04L 63/14 |
| 2018/0329958 | A1 * | 11/2018 | Choudhury | G06F 16/24568 |
| 2019/0081963 | A1 * | 3/2019 | Waghorn | G06F 9/542 |
| 2019/0342307 | A1 * | 11/2019 | Gamble | H04L 63/1416 |
| 2019/0394225 | A1 | 12/2019 | Vajipayajula et al. | |
| 2020/0177616 | A1 | 6/2020 | Hadar et al. | |

OTHER PUBLICATIONS

Notice of Allowance dated Jun. 24, 2020 in U.S. Appl. No. 16/215,491, pp. 1-6.
Office Action dated Feb. 10, 2020 in U.S. Appl. No. 16/215,491, pp. 1-10.
Office Action dated Aug. 16, 2019 in U.S. Appl. No. 16/215,491, pp. 1-14.

\* cited by examiner

*Primary Examiner* — Christopher A Revak
(74) *Attorney, Agent, or Firm* — Byrne Poh LLP (57) ABSTRACT

Systems and methods for performing graph-based analysis of computing system threats and incidents, and determining response and/or mitigation actions for the threats and incidents, are described. In some embodiments, the systems and methods generate node graphs of computing system threat artifacts, and perform actions to identify recommended resolutions to the threats, based on information derived from the generated node graphs.

18 Claims, 8 Drawing Sheets

DETERMINING COMPUTING SYSTEM INCIDENTS USING NODE GRAPHS

CROSS-REFERENCE TO RELATED APPLICATIONS

This application claims priority to U.S. Provisional Patent Application No. 62/345,468, filed on Jun. 3, 2016, entitled DETERMINING COMPUTING SYSTEM INCIDENTS USING NODE GRAPHS, which is incorporated by reference in its entirety.

BACKGROUND

In the cybersecurity industry, an indicator may be a forensic artifact or remnant of an intrusion that can be identified on a host or network. Example indicators, as described herein, include a domain that acts as a command and control source, or the file hash for a known piece of malware. Indicators help analysts to detect and investigate incidents. For example, they may be used during the incident response lifecycle to understand the potential damage to a system, and mitigate the attack to proactively prevent current or future damage to the system. For example, the system may operate under an underlying assumption that the artifact is malicious and that other artifacts with shared characteristics should be identified as being potentially malicious.

The various standards such as OpenIOC, IODEF, and Cybox/STIX/TAXII provide a standard language for describing incidents and indicators to simplify the exchange of such information. These standards aim to provide a mechanism for logically grouping descriptive terms about a specific threat. For example, an indicator could be a request in which source IP=1.2.3.4 and user-agent="Mozilla/5.0 (Windows NT 5.1; rv:31.0) Gecko/20100101 Firefox/31.0."

The conventional industry approach to managing indicators significantly impacts an enterprise's ability to analyze their own cyberattack data. Since the assessment of whether an artifact is malicious becomes tied to the actual event, enterprises are losing their historical record of cyberattack artifacts.

For example, an enterprise may have lists of bad IPs, but lack context about the circumstances in which those IPs were seen, how the IPs relate to other artifacts, whether the IPs are suggestive of a particular threat group, and/or whether they had threat intelligence about those IPs at any specific time. Enterprises are often not tracking the actual instances of identical or similar artifacts. Enterprises may also not have the ability to capture changes in their assessment of an indicator's maliciousness, or to flag specific artifact attributes (or combinations of artifact attributes) as being indicative of maliciousness.

These and other problems exist with respect to handling and/or mitigating attacks and other incidents to computing systems.

BRIEF DESCRIPTION OF THE DRAWINGS

Embodiments of the present technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods for performing graph-based analysis of computing system threats and incidents, and determining response and/or mitigation actions for the threats and incidents, are described. In some embodiments, the systems and methods generate node graphs of computing system threat artifacts, and perform actions to identify recommended resolutions to the threats, based on information derived from the generated node graphs.

For example, the systems and methods may generate a single node graph for a single threat artifact (e.g., a phishing email received by an enterprise email address), where nodes of the graph correspond to components and/or indicators of the threat artifact (e.g., sender email address or IP address, link in contents of message, and so on), and where edges connecting the nodes correspond to relationships between the components and/or indicators.

The systems and methods combine some or all of the single node graphs into a composite graph that represents the computing system. For example, the systems and methods may match common nodes to one another (e.g., different received artifacts may include the same link, even if they are from different sender addresses). Thus, the systems and methods may build a comprehensive or composite view of the attacks or other threats (and, associated vulnerabilities) to one or more distinct computing environments by joining single node graphs and/or composite node graphs into a large node graph that represents the computing environment (or, a current threat or attacks status of the computing environment). Thus, the joined node graphs may then represent some or all threats received by the computing environment, as well as any relationships or shared characteristics between the received threats.

Therefore, the systems and methods utilize the node graphs to determine how to respond to or mitigate received threats or other attacks, such as by determining and responding to an enterprise's risk landscape, determining how security operations may be improved and/or modified, determining who or what is attacking the computing environment/network, determining and/or identifying whether the attack is targeted to a certain device, user, set of data, or other target, determining whether the attack is related to past incidents, determining whether indicators are already blocked or mitigated, and/or other actions or operations that dynamically modify network operations and/or identify network operation or modify or protect, among other benefits.

In some embodiments, the system and methods may access multiple threat artifacts associated with a network of computing resources, generate a single node graph for each of the multiple threat artifacts, build a composite node graph for the network of computing resources that represents a current threat status of the network of computing resources, identify one or more attacks to the network of computing resources based on an analysis of the composite node graph, and perform an action to mitigate the identified one or more attacks to the network of computing resources.

In some embodiments, the systems and methods may mitigate attacks to a computing system, by generating node graphs for threat artifacts received by the computing system, where the node graphs include nodes representing indicators derived from the threat artifacts and edges that represent relationships between indicators, combining the generated node graphs into a composite node graph, where the composite node graph includes one or more intermediate nodes that join unique instances of an indicator derived from different artifacts received by the computing system, and performing an action based on an analysis of the composite node graph to dynamically adjust security operations of the computing system.

Various embodiments of the systems and methods will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Suitable Network Environment

Figure 1:
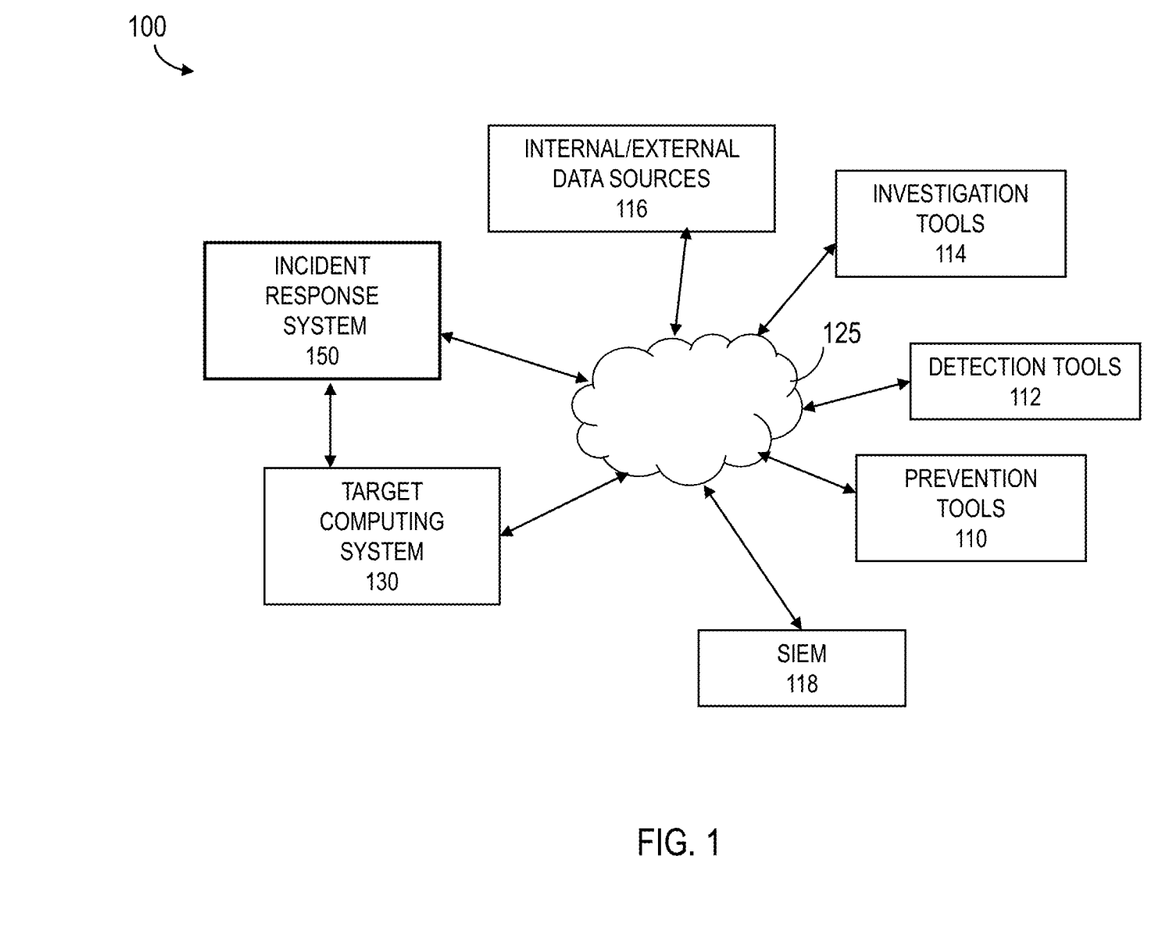
FIG. 1 is a block diagram illustrating a suitable computing environment for determining computing system incidents.

As described herein, the systems and methods, in some embodiments, generate node graphs that represent computing systems, networks of computing resources, and/or other computing environments, and utilize the generated node graphs to identify and/or determine potential or current attacks and/or threats to the computing environments. FIG. 1 is a block diagram illustrating a suitable computing environment 100 for analyzing and responding to system, network, and/or endpoint threats, attacks and other incidents at or received by a target computing system 130. The computing environment 100 includes an incident response system 150 configured to generate node graphs, as described herein, and perform actions based on information derived or determined from the node graphs, which may to resolve or address attacks to the target computing system 130.

In some embodiments, the incident response system 150 communicates with various entities or databases, either directly or over a network 125, in order to obtain information about incidents, threats, attacks, and so on at the computing system 130, exchange information, provide analysis data to one or more actionable tools or systems, and so on.

The incident response system 150 may communicate with prevention tools 110, such as tools provided by Palo Alto, McAfee, Fortinet, and so on, in order to provide the prevention tools 110 with actionable information to identify and resolve a threat or incident.

The incident response system 150 also communicates with detection tools 112, such as tools provided by Symantec, Cisco, FireEye, and so on, to receive threat artifacts and/or other information associated with current, ongoing, or previous attacks to or received by the computing system 130.

In some cases, the incident response system 150 utilizes various types of data (e.g., open source or other) provided by external and/or internal data sources 116 when building node graphs representing threat artifacts to the target computing system 130 and/or when mapping threat intelligence and histories for the target system 130. The incident response system 150 may exchange information with investigation tools 114, such as Bit9, Carbon Black, EnCase, and so on, and may provide analysis and response information and/or receive information, from various security information and event management (SIEM) systems 118, such as systems provided by HP, Splunk, IBM, and so on.

Thus, as depicted in FIG. 1, the incident response system 150 functions as a central repository or interface for incidents, indicators, threats, targets, and other entities or objects associated with attacks on networks and other computing resources, such as the target computing system 130. Using the various sources of data, the incident response system 150 creates node graphs, which identify explicit relationships between threats, surfaces implicit and derived relationships between artifacts and indicators extracted from the artifacts, automates the identification of new or previously unknown indicators, extracts attack vectors for attribution to various threat sources or targets, and so on.

Further, the incident response system 150, in some embodiments, automates or optimizes the response to cybersecurity threats and/or the mitigation of threats to the target computing system 130, increasing the speed and accuracy of identifying characteristics of attacks, identifying appropriate responses to the attacks, and/or dynamically network security operations, devices, and/or appliances, among other benefits.

FIG. 1 and the discussion herein provide a brief, general description of the components of the network environment 100. Although not required, aspects of the network environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, a mobile device or portable device may represent the server portion, while the server may represent the client portion.

Examples of Mitigating Security Incidents Received by a Computing Environment

Figure 2:
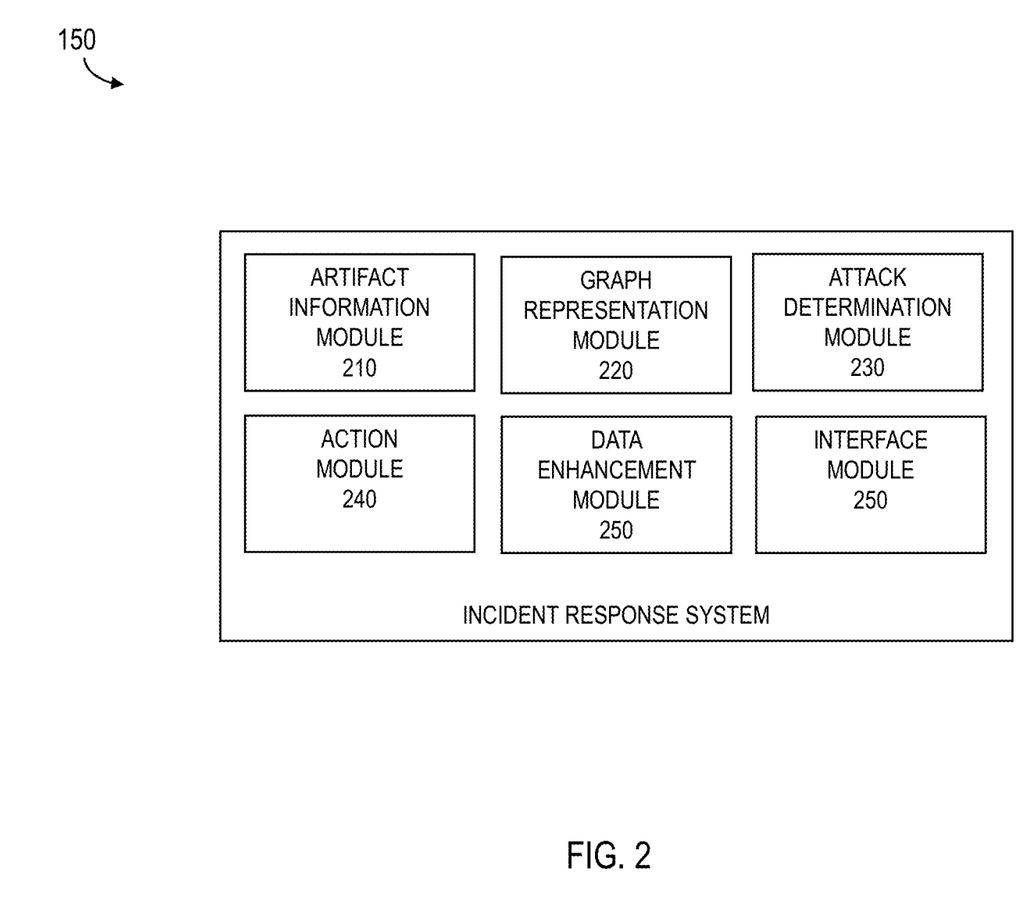
FIG. 2 is a block diagram illustrating components of an incident response system.

As described herein, the incident response system 150 includes various components configured to identify and mitigate threats, attacks, and other incidents received by or otherwise associated with a computing environment, such as the target computing system 130. FIG. 2 is a block diagram illustrating components of the incident response system 150.

The incident response system 150 may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the incident response system 150 may include an artifact information module 210, a graph representation module 220, an attack determination module 230, an action module 240, a data enhancement module 250, and/or an interface module 260.

In some embodiments, the artifact information module 210 is configured and/or programmed to receive and/or access information for multiple threat artifacts associated with a network of computing resources. For example, the artifact information module may access threat artifacts received by the target computing system 130, such as via the various information sources described with respect to FIG. 1.

In some embodiments, the graph representation module 220 is configured and/or programmed to generate a single node graph for each of the multiple threat artifacts and build a composite node graph for the network of computing resources that represents a current threat status of the network of computing resources. For example, the graph representation module 220 may generate single node graphs that include nodes that represent indicators for the artifact and edges that represent relationships between the indicators of the artifact.

Figure 3A:
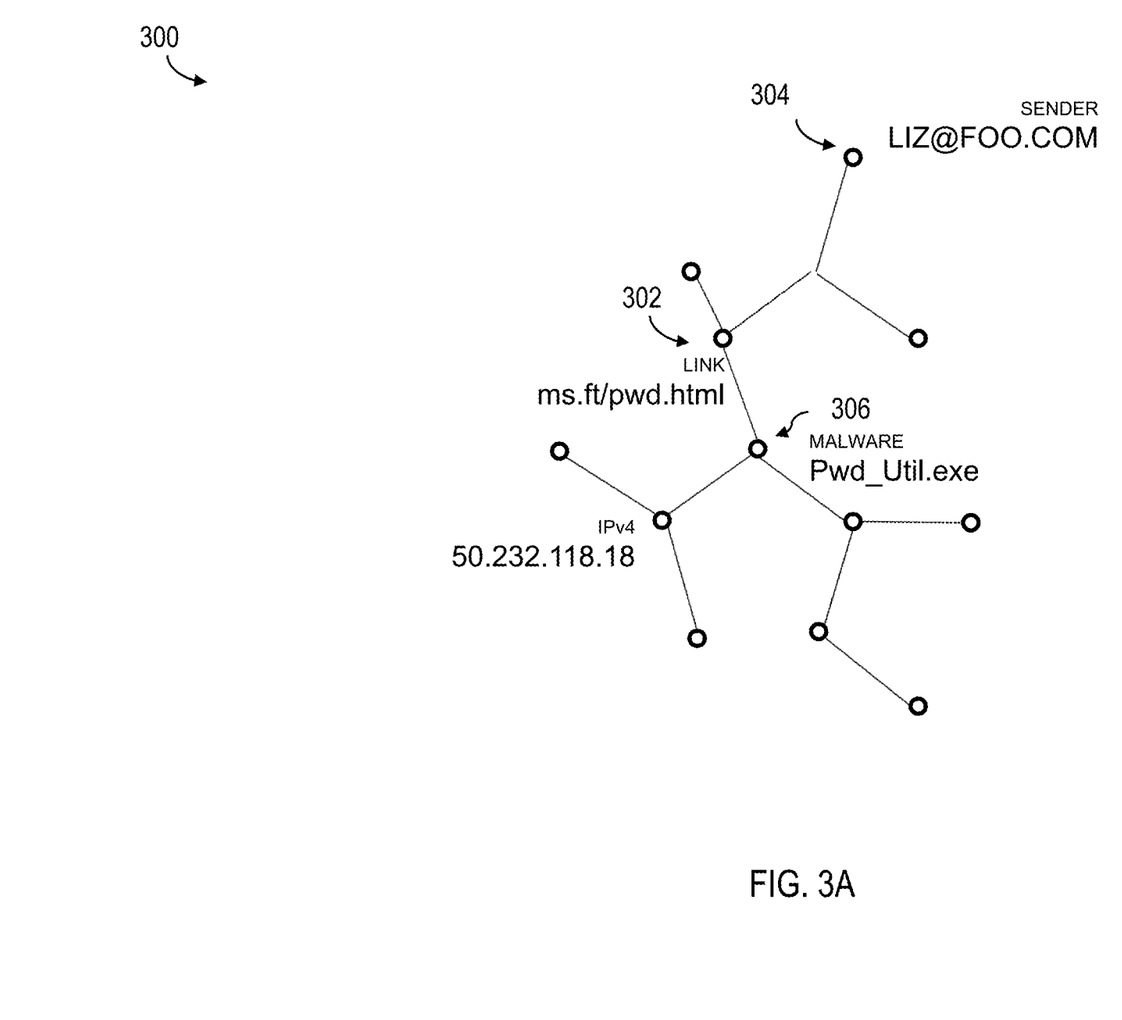
FIGS. 3A-3C are diagrams illustrating the representation of computing system incidents via generated node graphs.
Figure 3B:
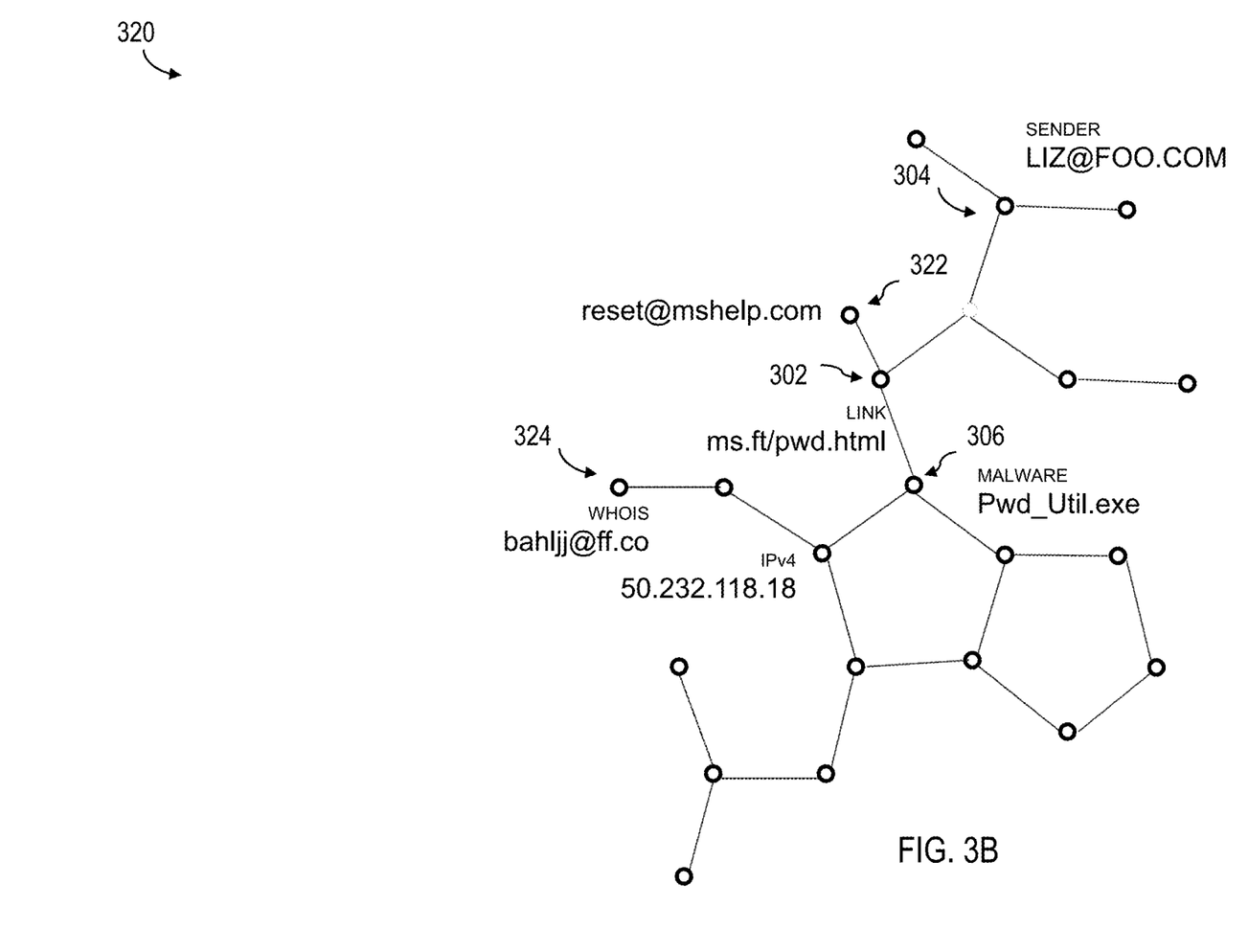
Figure 3C:
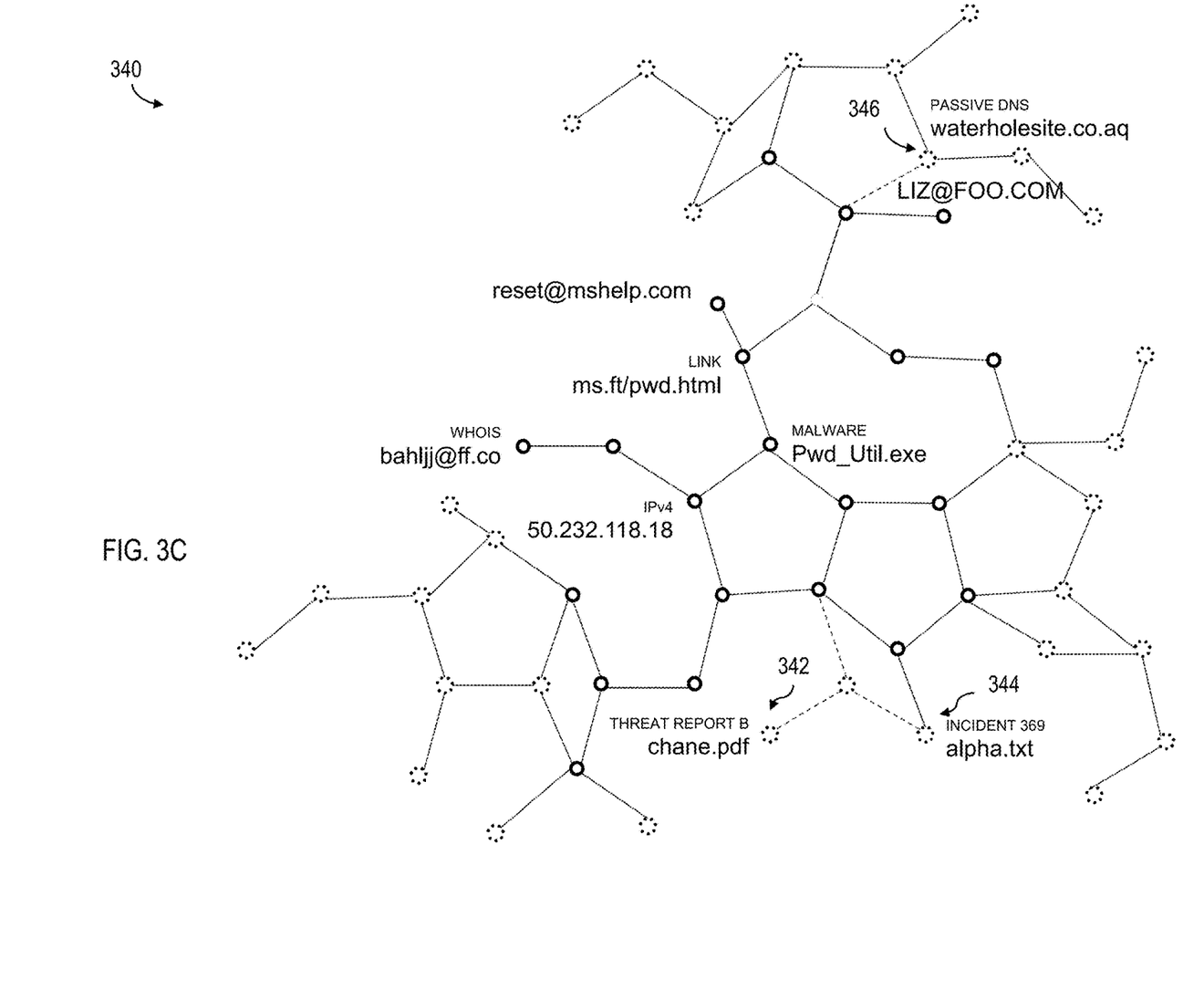

FIGS. 3A-3C illustrate the building of a composite node graph that represents incidents received by a computing system. For example, FIG. 3A depicts a node graph 300 generated for a threat artifact, such as a phishing email received by the target computing system 130. The node graph 300 includes a node for each characteristic, component, and/or indicator of the artifact, including a node 302 for a link ("ms.ft/pwd.html") within the artifact, a node 304 for the sender of the email (liz@foo.com), and a node 306 for a malware file (Pwd.Util.exe) attached to the email. The edges, or connections, between the nodes represent relationships between the different characteristics or indicators. Thus, the graph representation module 220 generates the node graph 300 via a flexible ontology, which maps the indicators within the artifact to the associated graph structure, as shown.

FIG. 3B depicts a node graph 320 enriched with open source data, such as data obtained from the external data source 116. For example, a new node 322 associated with an inbound email address (Reset@MShelp.com) has been added to the node graph 300, based on information that indicates a known relationship between the link, ms.ft/pwd.html, and the inbound email address represented by the nodes 302, 304 of the node graph 300.

Also, data from a domain registry, such as "whois," identifies the domain as being associated with an email address of bahljj@ff.co, and the module 220 adds an additional node 324 for the associated email address to the node graph 320, connecting the node to the other nodes to reflect the relationships between the indicators. Thus, the graph representation module 220 may expand or augment the node graph 320 with additional information associated with indicators derived from the artifact, such as via information accessed by the data enhancement module 250.

FIG. 3C depicts building of a composite graph 340, which includes the information from the artifact (the node graph 300), the added information from the open source data (the node graph 320), and historical incident and threat information associated with the artifact and/or indicators from the artifact. As shown, the system 150 identifies relationships with an indicator from a previous threat report (chane.pdf), represented by node 342, a technical artifact from a previous incident (alpha.txt), represented by node 344, and passive DNS data (waterholesite.co.ag), represented by node 346. The composite node graph 340, therefore, represents relationships between the artifact, information associated with characteristics of the artifact, and previous incident information related to the indicators of the artifact.

As shown in FIGS. 3A-3C, a composite node graph may combine information derived from different incidents at a computing system (e.g., the target computing system 130) based on relationships between indicators shared by the artifacts and other artifact information. In some embodiments, in order to preserve context and associated attributes for each unique instance of an indicator, the node graph may include intermediate nodes, or bridge nodes, which are added between nodes that represent two unique instances of a common indicator (e.g., instances of the same indicator derived from two different artifacts).

Figure 4:
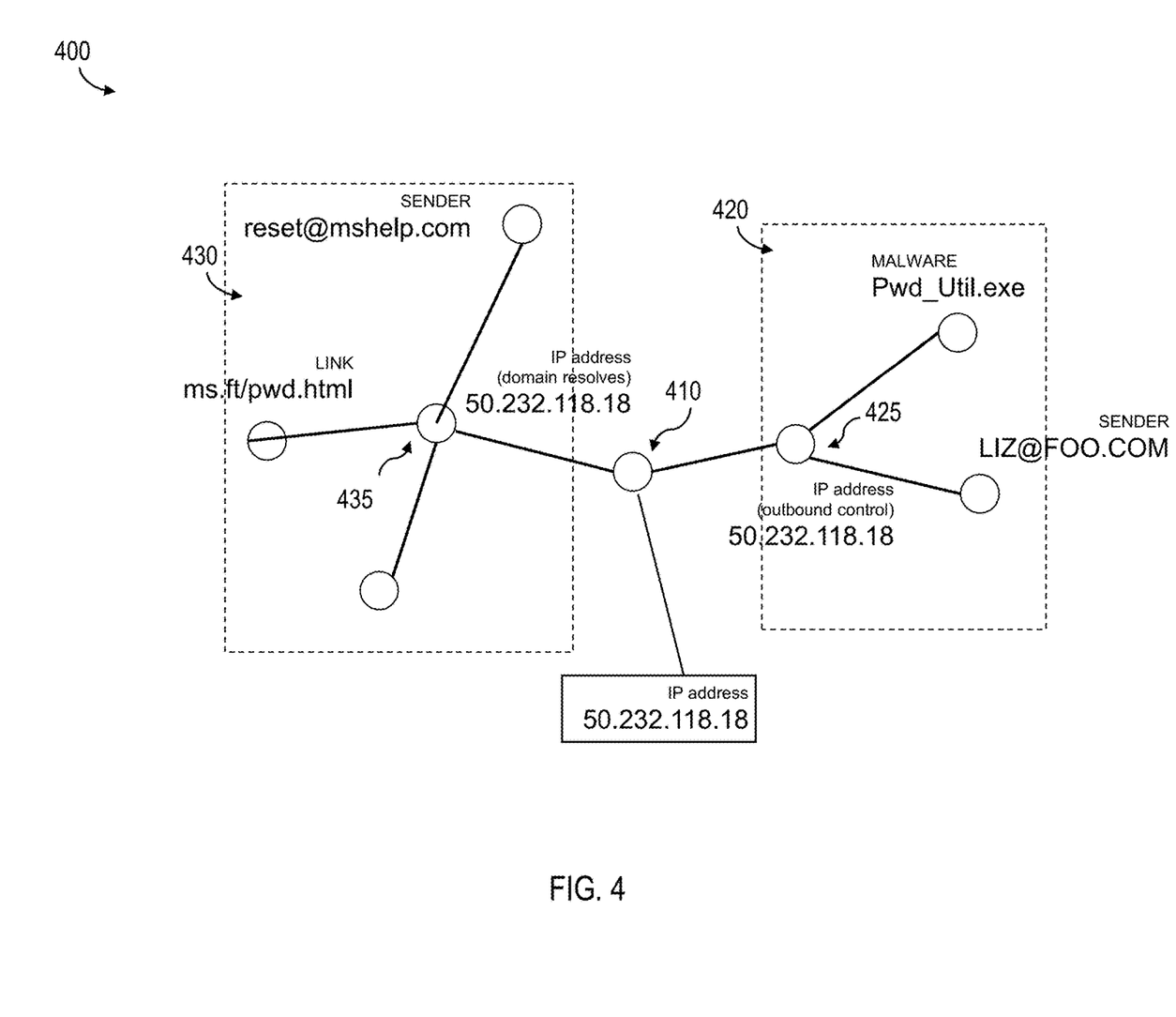
FIG. 4 is a diagram illustrating an intermediate node that joins similar indicators within a generate node graph.

FIG. 4 is a diagram 400 illustrating an intermediate node that joins or relates unique instances of an indicator within a composite or combined node graph. As depicted, an intermediate node 410 is associated with an indicator for an IP address "50.132.118.18." The intermediate node 410 is positioned between nodes that represent unique instances of the IP address from different artifacts, represented by node graph portions 420 and 430. For example, the intermediate node 410 is connected via an edge to node 425 of the node graph 420, which represents the IP address as an outbound control address derived from the artifact represented by node graph 420, and connected via an edge to node 435 of the node graph 435, which represents the IP address at which a domain resolves.

Therefore, intermediate nodes, such as node 410, enable the graph representation module 220 to connect unique instances with the same value, while preserving the context and associated attributes of each specific instance. For example, the node 410 is placed within the composite node graph depicted in FIG. 4 to distinguish when an IP address has been observed as the destination for outbound command and control communications, and when a domain resolved to the IP address. The system 150, therefore, enables an analyst utilizing the node graph 400 to determine the IP address is related to both situations, and may determine the IP address represents a threat or other incident in one of the circumstances, given the context provided by the node graph 400.

As described herein, the system 150, in generating node graphs, preserves the original context, automatically enriches the observables with open source data, and surfaces explicit and derived relationships for various indicators with threats and other incidents. In order to surface potential relationships, the system 150 generates a composite node graph, and then applies various analysis techniques.

In some embodiments, the system 150 generates node graphs in various phases, as follows:

First, the system 150 may list all available observable instances (e.g., an observed technical attribute of an attack artifact, such as an IP address, HTTP header, md5 hash, and so on), including observable instances from external data enrichment, such as open source data and/or threat intelligence. The external intelligence or data may result in new nodes, new edges, a different maliciousness level for a node, and/or a different weighting associated with an edge, as described herein.

Next, the system may establish directed and undirected edges between observables, weighted by association confidence. Edges that are actually seen may have high confidence, while external and/or inferred edges may have varying confidence weights. In addition, the origin of the edge derivation (actually observed vs. threat intelligence vs. machine learned) is preserved for each edge.

Further, the system 150 may assign each node an associated maliciousness level, derived as a function of ground-truth, neighbor maliciousness level confidence, neighbor association confidence weight, and other factors. The system 150 also preserves the information about where node maliciousness values are derived.

In some cases, the observables will be associated, but not as a parent-child relationship. For example, there may be a list of IPs associated with the same threat group, or the same DDoS attack. These IPs are related, but not in a hierarchical manner. Also, there are certain cases where the observables are parents of each other (e.g., the domain resolves to an IP, an IP being associated with that domain). In such cases, the parent-child relationship might describe the order in which the observables were investigated, or it could be a bi-directional edge.

In some cases, the system 150 generates a node graph that is specific to that enterprise, not only because of the uniqueness of their observable instances, but also because they may have different weighting algorithms.

Various factors may impact the weighting of nodes or other aspects of the node graphs, including:

Indicator Weighting: Two enterprises may have an identical domain indicator, but one enterprise may weight the domain name as being the suspicious characteristic, while another enterprise may weight the domain registrant as being the suspicious characteristic. Similarly, two enterprises may weight the entire indicator differently. Enterprise A might have seen the indicator so frequently that it would have high confidence that any request with that indicator should be flagged as malicious. Enterprise B may have never seen that indicator before and therefore has no confidence in its predictive quality. These weightings may also vary depending on the ordering or sequencing and timing of other indicators within a similar time window;

Observable Weighting: Certain observables associated with each object may have greater weight in determining the strength of its relationships with other indicators and/or observables (e.g., its potential correlation with other observable instances, whether it is a derivative or variant of an existing observable instance, whether a specific indicator applies to it, etc.). For example, the domain in the "From-Sender" observable might be a significant determinant of related emails. The number of overlapping or similar observables can also impact the likelihood that different observable instances are related. For example, two malware observable instances might have n overlapping observables. In the example, the overlap may suggest that these observable instances are closely correlated and that one piece of malware is a variant of the previous one;

Observable Value Weighting: An individual may have recently traveled to a location that made them a higher risk. E-mails sent to that individual would be more heavily weighted than those sent to other recipients, due to the higher likelihood that that individual would be a target, where weighting a particular value for an observable is higher than other values for that same observable. In such cases, the indicator is an e-mail, the observable is the recipient(s), and the weighted observable value is the name of the individual flagged as higher risk;

Indicator Collections: IP addresses are not necessarily strong standalone indicators of compromise if they are only limited to the IP address value (e.g., 157.166.249.11). They become more relevant if there uniqueness is determined by a combination of several IP address observables (e.g., IP address value, location, registrant). Enterprises may, therefore, weight different combinations of observables as indications of malicious activity;

Observable Relationship Volatility: A domain may be associated with multiple IP addresses over time for a single incident. In these cases, the frequency with which the domain is associated with an IP address and the total number of IP addresses can be as important as the specific IP address. The strength and stability of the domain to IP resolution may be reflected in its weighted confidence; and so on.

Referring back to FIG. 2, in some embodiments, the attack determination module 230 is configured and/or programmed to identify or determine one or more attacks to the network of computing resources based on an analysis of the composite node graph. For example, the attack determination module 230 may determine potential threats or future attacks to the target computing system 130

In some embodiments, once the system 150, via the graph representation module 220, constructs or builds a composite node graph for an enterprise or other computing system, the system 150, via the attack determination module 230, analyzes the node graph to understand the landscape of potential security threats for the enterprise.

In some cases, multiple individual graphs are merged into a larger aggregate graph, which would allow each enterprise to benefit from the data provided by other organizations. Using classical graph analysis techniques, the system 150 may analyze the clustering of entities in an attack vector, identify the major classes of attack vectors, and discover the distances between malicious entities. In addition, the system 150 may use statistical machine learning to cluster meta-graph information in an unsupervised manner, suggest potential associations between threat actors or targets or data artifacts, and perform natural language processing on text data artifacts.

The system 150, therefore, may determine the following information when analyzing the node graphs, such as the composite node graphs, for a state of incidents at the target computing system 130:

Target Relationships: An adversary may target an individual or group of individuals due to their system access rights that ultimately results in access to protected information. The incident response system 150, therefore, may identify and/or determine relationships between the targeted individual, their system access rights, and the information stored in the system;

Related Indicators: The incident response system 150 may identify other indicators that are similar to the indicators detected from an analysis of the node graph. For example, the system 150 may identify similar or related observables or indicators that are associated with the same threat group;

Incident Relationships: Incidents are essentially "communities" or partitions of the overall observable instance population. The system 150, in analyzing a node graph, may assess the "communication" between these communities, where the "communication" is the number and strength of the links between observable instances in separate communities. Once the cross-community communication reaches certain levels, the system 150 may determine, with greater confidence, that the incidents are related, are part of an overall attack campaign, could be associated with the same threat actor, and so on. Further, threat actors may be similar communities, but of indicators rather than observable instances.

Referring back to FIG. 2, in some embodiments, the action module 240 is configured and/or programmed to perform an action to mitigate the identified one or more attacks to the network of computing resources. For example, the action module 240 may dynamically adjust or modify various hardware appliances or security devices, or otherwise modify operation of a network or computing system, in response to the determination of potential or future attacks to identified threats by the attack determination module 230.

As described herein, the system 150 may perform various actions to respond and/or identify targets associated with the threat, based on the information derived from the node graphs. For example, the system 150 may determine whether a threat was targeted or not, may identify the threat actor or threat actor type, may determine whether the attack was successful, may identify whether data or other assets were compromised, and so on. These determinations may then be provided to the SIEM 118 or tools 110-114 to resolve or mitigate the threat, among other things.

In some embodiments, the data enhancement module 250 is configured and/or programmed to access data from one or more data sources external to the network of computing resources. For example, as described herein, the data enhancement module 250 may obtain or otherwise access external data, such as open source data, from resources over network 125, and augment or enhance the generated node graphs with the additional data.

In some embodiments, the interface module 260 is configured and/or programmed to generate a user interface that displays a graphical representation of the composite node graph, and present artifact information associated with one or more nodes displayed by the graphical representation of the composite node graph.

For example, the interface module 260 may render and/or present artifact information via displayed representation of the computing system 130 that depicts information identifying relationships between the artifact and one or more other artifacts of the network of computing resources and/or information identifying relationships between indicators associated with the artifact and one or more other artifacts of the network of computing resources.

Figure 5:
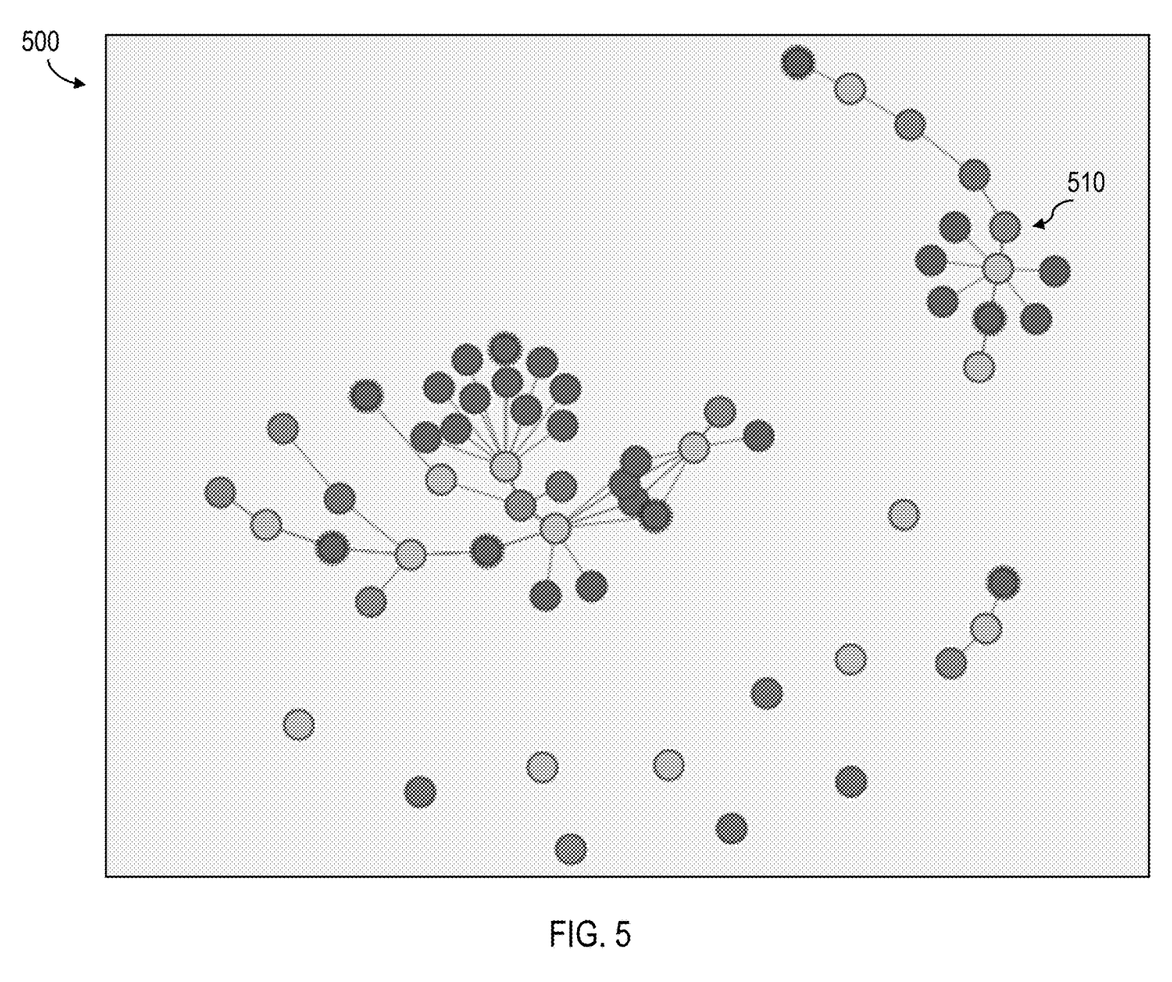
FIG. 5 is a display diagram illustrating an example user interface for presenting composite node graphs that represent a state of incidents for a computing system.

FIG. 5 is a display diagram illustrating an example user interface 600 for presenting composite node graphs that represent a state of incidents for a computing system. The user interface 500 depicts a visual display of a node graph for an enterprise. A user, via the interface 500, may navigate through the various nodes 510, selecting the nodes to expand and view details associated with the indicators or artifacts represented by the nodes.

Thus, as described herein, the incident response system 150 may perform various operations to extract incident information from a computing system, represent the incident via one or more node graphs, analyze the node graphs, and perform actions based on the analyses.

Figure 6:
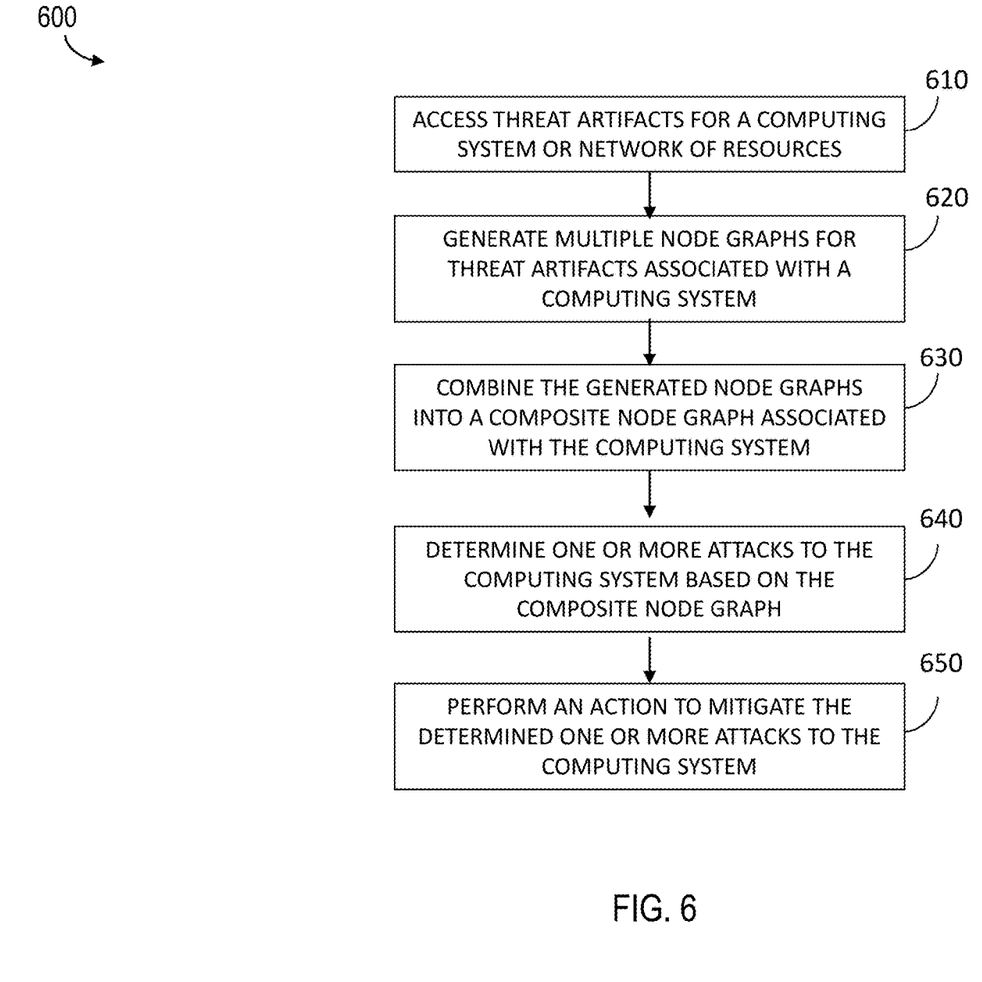
FIG. 6 is a flow diagram illustrating a method for mitigating attacks to a computing system.

FIG. 6 is a flow diagram illustrating a method 600 for mitigating attacks and other threats to a computing system. The method 600 may be performed by the incident response system 150, and, accordingly, is described herein merely by way of reference thereto. It will be appreciated that the method 600 may be performed on any suitable hardware.

In operation 610, the incident response system 150 accesses multiple threat artifacts associated with a network of computing resources. For example, the artifact information module may access threat artifacts received by the target computing system 130, such as via the detection tools 112.

In operation 620, the system 150 generates a single node graph for each of the multiple threat artifacts. For example, the graph representation module 220 may generate single node graphs that include nodes that represent indicators for the artifact and edges that represent relationships between the indicators of the artifact.

In operation 630, the system 150 builds a composite node graph for the network of computing resources that represents a current threat status of the network of computing resources. For example, the graph representation module 220 system 150 preserves the original context, automatically enriches the observables with open source data, and surfaces explicit and derived relationships for various indicators with threats and other incidents. In order to surface potential relationships, the system 150 generates the composite node graph, as described herein.

In operation 640, the system 150 identifies one or more attacks to the network of computing resources based on an analysis of the composite node graph. For example, the attack determination module 230 analyzes the clustering of entities in an attack vector, identify the major classes of attack vectors, and discover the distances between malicious entities within the graph. In addition, the module 230 may use statistical machine learning to cluster meta-graph information in an unsupervised manner, suggest potential associations between threat actors or targets or data artifacts, and perform natural language processing on text data artifacts.

In operation 650, the system 150 performs an action to mitigate the identified one or more attacks to the network of computing resources. For example, the action module 240 may dynamically adjust or modify various hardware appliances or security devices, or otherwise modify operation of a network or computing system, in response to the determination of potential or future attacks to identified threats by the attack determination module 230.

Thus, in some embodiments, an incident response system, such as a system integrated within an enterprise's network of computing resources and/or an external response system (e.g., system 150), generates node graphs of threat artifacts received at target systems, and perform actions to mitigate potential threats or attacks to the target systems based on various analyses of the generated node graphs.

For example, the system 150 may mitigate attacks to a computing system, by generating node graphs for threat artifacts received by the computing system, where the node graphs include nodes representing indicators derived from the threat artifacts and edges that represent relationships between indicators, combining the generated node graphs into a composite node graph, where the composite node graph includes one or more intermediate nodes that join unique instances of an indicator derived from different artifacts received by the computing system, and performing an action based on an analysis of the composite node graph to dynamically adjust security operations of the computing system.

Examples of Assessing Incidents at Target Systems

The incident response system 150, as described herein, distinguishes between the technical artifacts of an attack and the assessment of whether they are malicious. The technical artifacts, referred to as observable instances or indicators, are immutable as these are actual observed events. The assessment of whether those artifacts are malicious can change over time. The reasoning behind why they are malicious can be explicit or derived through surfaced relationships. The system 150, therefore, may refer to the rules describing malicious attributes and their associated values as indicators.

In some cases, the system 150 may refer to both indicators and observable instances as indicators, although, as described with respect to intermediate nodes within a node graph, an indicator may be represented by multiple different instances (represented by separate nodes within the node graphs). Therefore, indicators may be applied to an enterprise's observable instances to identify potentially malicious behavior at or to a computing system, such as the target system 130.

Again, observable instances are attributes or characteristics of the technical artifacts of an attack, threat, or other incident to a computing system. Each type of technical artifact has a set of eligible attributes that are defined by the system's ontology. For example, an e-mail object will have a "sender" attribute, which would not be relevant for a domain or IP address. The set of eligible attributes for an object may be defined by the ontology, while the actual values for a particular artifact are an observable instance (or, indicator, as described herein). For example, the separate ontology allows for the flexibility and extensibility of the data model, while the observable instances may preserve the original context.

In some embodiments, an incident is an instance of an attack targeting people, systems and/or information. For example, an incident could involve several targets receiving a spear-phishing e-mail with a malicious attachment, or the detection of unauthorized data access on a system. An incident includes event data and technical artifacts, which constitute the observable instances for a particular attack. The same threat group might attack two enterprises using the same approach. Even if this results in an identical set of observables, these may be two different incidents, due to different targets and timing. Thus, an analyst may be able to attribute an incident to a threat group and its associated threat type, or only to a threat type. In some cases, the analyst may not be able to attribute the incident to a particular adversary. Further, incidents may be associated with one or more alerts.

In some embodiments, alerts are created by users on the front end or pushed via some integration. An alert is typically an automatic notification of an event that is sent by an enterprise's security appliances. An alert is triggered when a security appliance identifies potentially malicious activity through signature matching, anomaly detection, or other analysis. Alerts can be escalated to incidents if they match certain business rules or contain artifacts that match malicious identifiers. Alerts can be related to multiple incidents, and are linked to observable instance groups.

In some embodiments, an observable instance group is a subgraph representation of observable instances coming from an alert. They may be not relevant to the user, but are utilized by the backend for grouping. Further, an observable instance is one entity within an observable instance group, or an instantiation of an observable, such as a sender email address. The observable instance may be linked to an observable, and has a type and token. For example, an observable may have a type and token, such as:

Example: _type: observable, type: email, token: <message-id>, and may be linked to a rule (or rules).

In some embodiments, a rule is related to a set of observables based on the rule's lexeme. Example rule: (A && B)||(B^C), where, A, B, and C are lexemes of the rule. A (a lexeme) COULD be another rule, for example A==A && D. A, B, and C are also observables (that create lexemes that create a rule). A rule may be linked to an indicator.

In some embodiments, an indicator is always or often unique, and is an instantiation of a rule, much like how an observable instance is an instantiation of an observable. Scenario: an analyst creates an indicator and Rule A based on a malicious URL, www.satan.gov. The same day, another analyst creates another distinct indicator with the same rule, since it is based on the same URL, www.satan.gov. Now, two distinct indicators exist (1. satan.gov is malicious, created by the first analyst at noon, and 2. satan.gov is malicious, created by the second analyst at 3 pm) with the same rule (Rule A, satan.com is malicious). An indicator may have a confidence score, which may originate from an analyst, an integration or a weighted score based on multiple parameters. Indicators may be linked to alerts In some embodiments, a target may be a system, individual, or information asset, such as the target computing system 130. Targets may be linked to an observable, an incident, and so on. Threat Actors, similarly, may be linked to an observable instance, observable, incident, and so on. Correlations come from threat intelligence (e.g., graphs), and can be definitive: an analyst may be certain the Food Haterz are associated with a particular incident, or could be associated via links, and another analyst gathers intel on the Food Haterz, sees that they always send links in emails from the domain soylent.college, which is domain associated with other incidents. The system 150 indirectly associates the incidents with the threat group the Food Haterz.

In some embodiments, the system 150 utilizes a current observable ontology that focuses on IP address, domain, file and email objects, but also expands to derive other indicators from artifacts. For example, the following table (e.g., Table 1) shows a sample email and three email observable instances that vary only in the value of their "DateTimeSent" property.

TABLE 1

| E-mail Observable Definition | A. E-mail Observable Instance | B. E-mail Observable Instance | C. E-mail Observable Instance |
|---|---|---|---|
| Eligible Child Observables | Values | Value | Values |
| FromSender | foo@gmail.com | foo@gmail.com | foo@gmail.com |
| SpoofedSender | alert@company.com | alert@company.com | alert@company.com |
| CC | | | |
| BCC | | | |
| DateTimeSent | | Jan. 14, 2013 4:56 | May 2, 2014 9:09 |
| Subject | Security alert | Security alert | Security alert |
| SubjectTranslation | | | |
| SourceIP | 47.256.35.12 | 47.256.35.12 | 47.256.35.12 |
| RelayIP | 59.223.5.1 | 59.223.5.1 | 59.223.5.1 |
| MessageBody | Please find the attached security alert. | Please find the attached security alert. | Please find the attached security alert. |
| MessageBodyKeywords | security, alert, attached | security, alert, attached | security, alert, attached |
| FullHeader | | | |
| FullHeaderKeywords | | | |
| Recipients | liz@company.com | liz@company.com | liz@company.com |
| VisibleLink | | | |
| ActualLink | | | |
| AttachmentFile | alert.exe | alert.exe | alert.exe |
| XMailer | | | |

The system 150, therefore, captures complex observable instance relationships, such as nested observable instances, and allows an observable instance to act as a future pivot point. For example, an observable instance may contain a reference to another observable instance, which could result in a list of linked observable instances. For example, an e-mail might have a link embedded within its message body. If the user clicks that link, a file might be downloaded that would send command and control communications to an external server. This sequence of events may create linkages between multiple observables: the original e-mail, the domain from the link in the e-mail, the file downloaded from the link domain, and the domain(s) for the command and control communications.

In addition, each domain may be associated with IP addresses and potentially additional e-mail addresses from the domain registrar. For example, a threat group may send a spear-phishing e-mail from liz@foo.com. This e-mail has an embedded link to http://www.computer.org/question.html that downloads malware when clicked. The downloaded malware then makes a call out to http://www.computer.org for command and control communications. For example, the email is represented as follows:

Object: E-mail4972
  Property: FromSender=liz@foo.com
  Property: To=roselle@uplevel.com
  Object: Domain927
    Property: Domain=www.computer.org
    Property: Path="/question.html"
    Event: Clicked
      Event Property: Timestamp: Jan 1, 2015 07:45:00
      Object: File112
        Property: MD5=bfjsagjlang
        Event: Downloaded
          Event Property: Timestamp: Jan 1, 2015 07:46:00
          Event Property: ToMachine: roselle-foo-laptop
          Object: DomainB7
            Property: www.computer.org
Event: Received
    Event Property: Timestamp Jan 1, 2015 06:31:00

The nature of the relationship between Email4972 and Domain927 (embedded link), Domain 927 and File 112 (malware download link), and File 112 and Domain87 (command communication domain) is described separately. Because Domain 927 and 87 are distinct instances, the recursion stops at Domain87 as it is a standalone object with no child objects. The system 150 may then search for all observable instances where domain="computer.org", regardless of the surrounding context. The system 150 may analyze the different instances, visually show how the same domain is used in different circumstances, and identify related incidents even though the domain was used under different conditions, as described herein.

The system 150, in generating the node graphs described herein, preserves the contextual hierarchy of the observable instances. There are multiple different ways of codifying the hierarchy, such as the inclusion of an observable definition. In such cases, if a new relationship is detected, or an object's role in the hierarchy changes, the observable instance values remain the same, but the observable definition ID changes. There is a different observable definition ID depending on whether an object is standalone or a child.

For example, an observable definition ID 2 is used for a standalone file, while observable definition ID 5 is used for a file with a parent email (see Table 2) If a file is originally identified as standalone, but is then determined to be the child of an email, the observable definition ID and the observable parent ID changes for that file observable instance. Note that the observable definition ID associated with an observable instance always assumes that the instance is the child in the observable definition. In some cases, the system 150 may maintain parent-child relationships as separate links.

TABLE 2

| Observable ID | Name | | |
|---|---|---|---|
| 1 | 0 | | |
| 2 | hrcy | | |
| 3 | file | | |
| 4 | email | | |
| 5 | filename | | |
| Observable Definition ID | Parent | Child | Description |

TABLE 2-continued

| 1 | 1-0 | 2-hrcy | |
| 2 | 2-hrcy | 3-file | standalone file |
| 3 | 2-hrcy | 4-email | standalone email |
| 4 | 3-file | 5-filename | property of file object |
| 5 | 4-email | 3-file | file that is attached to an email |

In some embodiments, each observable object has a default name and a default indicator rule based on one of its observable properties. When an observable instance is created, a default indicator rule is generated if it does not yet exist. The assumption is that the user has submitted that observable instance because it is malicious.

In some embodiments, different enterprises may have different weights for the malicious prediction quality of each observable. These differences may be due to the enterprise's unique set of indicators from previous incidents, external threat intelligence, or deployed security appliances. In the following table (Table 3), a Financial Services company and a Retailer have almost identical e-mail observable instances, with the only differences being the Recipient and the DateTimeSent fields.

The Financial Services company has flagged this as a malicious e-mail due to the FromSender because they had previously seen spear phishing e-mails from this address. They could use the default indicator where the FromSender, foo@gmail.com, is identified as malicious. The Retailer flagged it due to the SourceIP that had been associated with a DDoS attack. The Retailer may have had an existing indicator for the IP address, 47.256.35.12, since it was seen in a previous attack. They might create an additional indicator that incorporates more context, such as "FromSender=foo@gmail.com AND SourceIP=47.256.35.12".

TABLE 3

| Observable | Financial Services Values | Retailer Value |
|---|---|---|
| From Sender | foo@gmail.com | foo@gmail.com |
| SpoofedSender | alert@company.com | alert@company.com |
| CC | | |
| BCC | | |
| DateTimeSent | Jan. 14, 2013 4:56 | Jan 4, 2013 4:58 |
| Subject | Security alert | Security alert |
| SubjectTranslation | | |
| SourceIP | 47.256.35.12 | 47.256.35.12 |
| RelayIP | 59.223.5.1 | 59.223.5.1 |
| MessageBody | Please find the attached security alert. | Please find the attached security alert. |
| MessageBodyKeywords | security, alert, attached | security, alert, attached |
| FullHeader | | |
| FullHeaderKeywords | | |
| Recipients | liz@bank.com | liz@company.com |
| VisibleLink | | |
| ActualLink | | |
| AttachmentFile | alert.exe | alert.exe |
| XMailer | | |

As another example, an enterprise could have two spear-phishing incidents that they believe to be associated with the same threat group. Each incident could have an e-mail object as well as other objects. The observables associated with each e-mail object might be different with the exception of the "sender" observable property, which could be the same and therefore why the enterprise thought the incidents could be attributed to the same threat group.

In some embodiments, indicators are determined from a variety of sources, including:

Analyst knowledge about malicious characteristics: Analysts may be able to manually create rules based on their own experience;

Threat intelligence reports: These are automated feeds or written reports listing malicious characteristics As described herein, the system 150 automatically parses and extracts the indicators, and associates them with their sources;

Derived indicators: Derived indicators are based on various analysis techniques; and so on.

While some indicators have a fairly flat and simple structure, the system 150 supports various indicator structures, such as:

Single object with a single property: file_name=foo.exe;
Single object with a single event;
Single event with a single event property;
Single object with a single event property;
Single object with multiple properties: file_name=foo.exe and file_size>16800;
Single event with multiple event properties;
Single object with multiple properties and events;
Single object with multiple properties and event properties;
Single object with multiple properties, events, and event properties;
Multiple related objects: email with FromSender=liz@foo.com and attached file with file_name=foo.exe;
Observable composition: ((A OR B) AND C);
file_name=foo.exe OR FromSender=liz@foo.com AND destination_IP=43.123.99.25;
Partial matching, such as Indicator=email with FromSender=liz@foo.com and attached file with file_name=foo.exe but only FromSender=liz@foo.com matches or FromSender matches but file_name=boo.exe; and so on.

The system 150 may manage indicators as follows:
Creating default indicator rules, where analysts manually flag individual attributes to create additional indicator rules, as well as create composite indicators (e.g., AND/OR logic);

Weighting of indicator components, where the system 150 applies the relevant indicators to observable instances to identify potentially malicious observable instances. Since threat intelligence analysts may want to review their indicators to determine which ones should be applied, the system 150 may decompose indicators into their atomic components, and then reconstruct the original indicator.

In order to support such weighting, the system 150 may store the indicators in a manner in which they can be easily decomposed, such as where an indicator is decomposed into two indicator detail groups with a total of three indicator details. When applying indicators to observable instances, the system 150 may return not only the observable instance that "matches," but also the parent object and related child attributes. For example, if the indicator is "domain path=/question.html is malicious," the system 150 may return those instances, but also the domains associated with that domain path. If it is a compound indicator, the system 150 may return the partial matches for each component, as well as the first common parent object. For example, the system 150 may return the following from the example email discussed herein:

Indicator: MD5=bfjsagilang OR (domain path="/question.html" AND file dropped on to_machine="roselle-foo-laptop")
Indicator Detail Group A: MD5=bfjsagilang
Indicator Detail Group B: domain path="/question.html" AND file dropped on machine="roselle-foo-laptop"

Indicator Detail B1: domain path="/question.html"

Indicator Detail B2: file dropped on machine="roselle-foo-laptop"

In some cases, the system 150 imports external indicators that are published in various standard formats, and exports indicators in the standard formats, such as by seamlessly converting information between different formats. The organizations or enterprises may also have granular control over which data elements are shared and with which recipients.

Incident: An incident is an instance of an attack targeting people, systems and/or information. For example, an incident could involve several targets receiving a spear-phishing e-mail with a malicious attachment or the detection of unauthorized data access on a system. An incident consists of event data and technical artifacts, which constitute the observable instances for a particular attack. The same threat group might attack two enterprises using the same approach. Even if this results in an identical set of observables, these would be two different incidents due to different targets and timing. An analyst may be able to attribute an incident to a threat group and its associated threat type or only to a threat type. In some cases, the analyst may not be able to attribute the incident to a particular adversary.

CONCLUSION

Unless the context clearly requires otherwise, throughout the description and the claims, the words "comprise", "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein", "above", "below", and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A system, comprising:
a memory;
a hardware processor coupled to the memory and configured to:
access multiple threat artifacts associated with a network of computing resources;
generate a single node graph for each of the multiple threat artifacts;
derive an intermediate node based on two of the multiple threat artifacts;
build a composite node graph for the network of computing resources that represents a current threat status of the network of computing resources, wherein the composite node graph includes the single node graphs and the intermediate node, and wherein the intermediate node connects the single node graphs corresponding to the two of the multiple threat artifacts;
identify one or more attacks to the network of computing resources based on an analysis of the composite node graph; and
perform an action to mitigate the identified one or more attacks to the network of computing resources.

2. The system of claim 1, wherein the hardware processor is further configured to access data from one or more data sources external to the network of computing resources and augment the composite node graph with one or more additional nodes that represent data from the one or more data sources that is related to information associated with one or more nodes of the composite node graph.

3. The system of claim 1, wherein the hardware processor is further configured to:
generate a user interface configured to display a graphical representation of the composite node graph; and
present artifact information associated with one or more nodes displayed by the graphical representation of the composite node graph,
wherein the presented artifact information includes information identifying relationships between the artifact and one or more other artifacts of the network of computing resources.

4. The system of claim 1, wherein the hardware processor is further configured to:
generate a user interface configured to display a graphical representation of the composite node graph; and
present artifact information associated with one or more nodes displayed by the graphical representation of the composite node graph,
wherein the presented artifact information includes information identifying relationships between indicators associated with the artifact and one or more other artifacts of the network of computing resources.

5. The system of claim 1, wherein the hardware processor is further configured to access information provided by detection tools configured to detect threats to the network of computing resources.

6. The system of claim 1, wherein each of the single node graphs include nodes that represent indicators for the artifact and edges that represent relationships between the indicators of the artifact.

7. The system of claim 1, wherein the hardware processor is further configured to analyze clusters of nodes in an attack vector of the composite node graph, identify major classes of attack vectors within the composite node graph, or determine distances between nodes associated with malicious entities within the composite node graph.

8. The system of claim 1, wherein the hardware processor is further configured to perform an action to dynamically adjust or modify operation of security devices of the network of network resources.

9. The system of claim 1, wherein the one or more attacks are identified by an attack determination module and wherein the hardware processor is further configured to perform an action to modify operation of the network of computing resources to prevent the one or more attacks identified by the attack determination module.

10. A method, comprising:
accessing multiple threat artifacts associated with a network of computing resources;
generating a single node graph for each of the multiple threat artifacts;
derive an intermediate node based on two of the multiple threat artifacts;
building a composite node graph for the network of computing resources that represents a current threat status of the network of computing resources, wherein the composite node graph includes the single node graphs and the intermediate node, and wherein the intermediate node connects the single node graphs corresponding to the two of the multiple threat artifacts;
identifying one or more attacks to the network of computing resources based on an analysis of the composite node graph; and
performing an action to mitigate the identified one or more attacks to the network of computing resources.

11. The method of claim 10, further comprising:
generating a user interface configured to display a graphical representation of the composite node graph; and
presenting artifact information associated with one or more nodes displayed by the graphical representation of the composite node graph,
wherein the presented artifact information includes information identifying relationships between the artifact and one or more other artifacts of the network of computing resources.

12. The method of claim 10, further comprising:
generating a user interface configured to display a graphical representation of the composite node graph; and
presenting artifact information associated with one or more nodes displayed by the graphical representation of the composite node graph,
wherein the presented artifact information includes information identifying relationships between indicators associated with the artifact and one or more other artifacts of the network of computing resources.

13. The method of claim 10, further comprising accessing phishing emails received by the network of computing resources.

14. The method of claim 10, wherein each of the single node graphs include nodes that represent indicators for the artifact and edges that represent relationships between the indicators of the artifact.

15. The method of claim 10, wherein performing an action to mitigate the identified one or more attacks to the network of computing resources includes dynamically adjusting or modifying operation of security devices of the network of network resources.

16. The method of claim 10, wherein performing an action to mitigate the identified one or more attacks to the network of computing resources includes modifying operation of the network of computing resources to prevent future attacks.

17. A non-transitory computer-readable medium whose contents, when executed by a hardware processor of a computing system, cause the incident response computing system to perform a method for mitigating attacks to the computing system, the method comprising:
generating a single node graph for each of multiple threat artifacts received by the computing system,
wherein the single node graphs include nodes representing indicators derived from the multiple threat artifacts and edges that represent relationships between indicators;
deriving an intermediate node based on two of the multiple threat artifacts;
combining the single node graphs and the intermediate node into a composite node graph, wherein the intermediate node connects the single node graphs corresponding to the two of the multiple threat artifacts; and
performing an action based on an analysis of the composite node graph to dynamically adjust security operations of the computing system.

18. The non-transitory computer-readable medium of claim 17, wherein the single node graphs include nodes having weights associated with a determined maliciousness assigned to the indicators represented by the nodes.

* * * * *

UNITED STATES PATENT AND TRADEMARK OFFICE
CERTIFICATE OF CORRECTION

PATENT NO. : 10,958,667 B1
APPLICATION NO. : 15/612373
DATED : March 23, 2021
INVENTOR(S) : Elisabeth Maida and Roselle Safran Page 1 of 1

It is certified that error appears in the above-identified patent and that said Letters Patent is hereby corrected as shown below:

In the Claims

Column 20, Claim 17, Line 44, the line: "computing system, cause the incident response computing" should be --computing system, cause the computing--.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*